Jan. 19, 1954　　　A. BRANDT　　　2,666,264
READJUSTABLE MECHANICAL GAUGE
Filed April 13, 1950
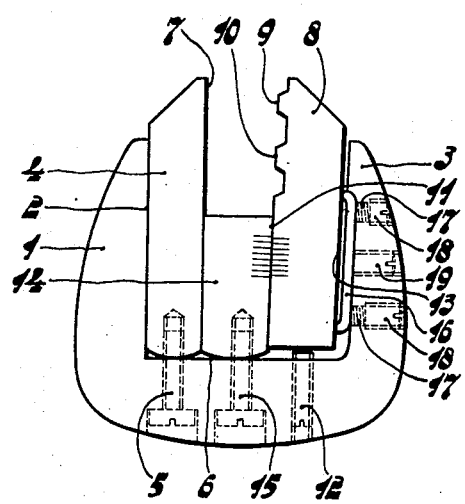
INVENTOR.
ADRIANUS BRANDT
BY
AGENT Patented Jan. 19, 1954

2,666,264

UNITED STATES PATENT OFFICE 2,666,264

READJUSTABLE MECHANICAL GAUGE

Adrianus Brandt, Eindhoven, Netherlands, assignor to Hartford National Bank and Trust Company, Hartford, Conn., as trustee Application April 13, 1950, Serial No. 155,757

Claims priority, application Netherlands May 31, 1949

6 Claims. (Cl. 33—168)

This invention relates to readjustable mechanical gauges.

Readjustable gauges for determining at least reference measurements are known. The surfaces determining the reference measurements are readjusted with the use of screws which in turn are secured in position by other screws. Readjustment of the surfaces during inspection takes up considerable time and may be effected only by skilled labour, and, in addition, it has been found in practice that, after accurate adjustment of the reference surfaces during the operation of securing and if necessary, lackering of the other screws, the reference surfaces may shift.

The object of the invention is to provide an improved readjustable gauge.

According to the invention a readjustable gauge for determining at least two reference measurements is characterized in that all the measuring parts are provided on two component parts of the gauge, one of each pair on the one component part and the other of each pair of measuring parts on the other component part, the measuring parts provided on each component part of the gauge are located in one plane, the two planes making an acute angle with one another and one component part of the gauge is displaceable with respect to the other component part to adjust the reference measurement. A measuring part may be a point, an edge or a surface.

In a preferred embodiment of the invention, one component part of the gauge is displaceable with respect to the other in a direction at right angles to the plane in which the measuring parts of the other component part of the gauge lie. It is thus ensured that, for example, in a gauge for determining upper and lower limits, the difference between the two limits end hence the so-called tolerance remains constant upon readjustment.

One part of the gauge may be displaceable with respect to the other by displacement of a wedge in a direction parallel to one of its converging surfaces. Preferably, one of the converging sides of the wedge is parallel to the one plane and the other of the converging sides of the wedge is parallel to the other plane. The converging sides may lie in the said planes.

The angle between the converging surfaces of the wedge-like body may be given any arbitrary value. The slope of one converging surface of the said body with respect to the other is preferably 1:300 to 1:1000. This low slope ensures that a comparatively small shift of one component part of the gauge results in a very small shift of the two component parts with respect to one another, so that readjustment is facilitated. The wedge and one of the component parts of the gauge may be graduated, the graduations jointly constituting a vernier scale and it is possible, if the gauge is finished accurately, that the desired readjustment of the measuring parts may take place solely with the aid of this vernier scale.

One or both of the component parts of the gauge may have at least two surfaces constituting the measuring parts which are integral with the associated component part of the gauge. In known constructions of gauges, the measuring parts are in most cases provided on separate parts which are screwed into the component part of the gauge and which in turn require to be fixed in position by adjusting screws. It is evident that this is an expensive construction and one which during adjustment may give rise to errors. These disadvantages may thus be obviated and the finishing operation materially simplified in the gauge according to the invention.

It is advantageous if the gauge according to the invention comprises one component part the measuring parts of which are provided in a continuous surface whereas the measuring parts of the other component part of the gauge are provided on two or more projections.

In order that the invention may be more clearly understood and readily carried into effect, it will now be described more fully by reference to the accompanying drawing, given by way of example.

Referring now to the figure, an inner surface 2 of a U-shaped body 1 is ground plane. One component part 4 of the gauge within the body 1 engages the surface 2 and is tightly drawn by means of a screw 5 against an inner bottom surface 6 of the body 1. The surface 7 remote from the surface 2 of the component part 4 is ground plane, as is the surface adjacent the surface 2, whereas its lower surface is slightly spherically curved. Provided adjacent and within the other limb of the body 1 is a component part 8, comprising two measuring parts 9 and 10, which in this case are surfaces extending in the same plane as a surface 11 of this component part of the gauge. The component part 8 of the gauge bears upon an adjustable screw 12. The two surfaces 11 and 13, which constitute the two sides of this component part of the gauge, are parallel to one another. Between the surfaces 7 and 11 and hence between the two component parts of the gauge is a wedge 14, which in cross-section has two mutually perpendicular sides, a curved side and a fourth side which makes an angle with each of the mutually perpendicular sides. The last-mentioned side engages the surface 11 of the component part 8 of the gauge. The wedge 14 is held in position by means of a screw 15. The component part 8 of the gauge is held in position by means of a clasp 16, which is urged against the component part 8 of the gauge by two springs 17, the compression of which is determined by screws 18. Furthermore, the clasp 16 may be held in position by means of a screw 19.

Each of the surfaces 9 and 10, which make an acute angle with the surface 7, constitutes a measuring part and the reference measurements are provided between the surface 7 and the surface 9 and between the surface 7 and the surface 10. The difference between the two reference measurements is determined by the distance between the surfaces 9 and 10 and the angle between the surface 7 and the surfaces 9, 10 and 11. It is thus possible to construct a gauge for any quality (so-called "ISA" quality), the reference measurement 7—9 being, for example, the side of approval of the gauge concerned, whereas the side of rejection is the reference measurement 7 and 10. It is evident that enlargement of the distance between the surfaces 9 and 10 results in variation of the difference between the sides of approval and of rejection. It is furthermore possible to provide a third surface constituting a measuring part which may provide, for example, a preliminary reference measurement.

If the measuring parts lying in the surfaces 7 and 9 and 10 become worn, the screw 19 is slightly loosened. Subsequently, the screw 12 is slightly unscrewed, so that the component part 8 of the gauge can perform a small movement along the wedge 14. If the slope of the surface 11 with respect to the surface 7 is sufficiently small (for example 1:500), a comparatively large displacement of the component part 8 of the gauge along the wedge 14 corresponds to a very small shift of the component part 8 towards the component part 7 of the gauge. As soon as the desired readjustment is effected, the screw 19 is tightened. It is advantageous if both the wedge 14 and the component part 8 are graduated, the graduations jointly constituting a vernier scale. It has been found in practice that, if the gauge is manufactured accurately, readjustment may be effected with the use of the vernier scale.

In the figure, the surfaces 9 and 10 constituting measuring parts and the surface 11 lie in the same plane. This affords advantages if the surfaces 9 and 10 are worn to an extent such that a resurfacing operation is required. In this case, the entire component part 8 of the gauge may be resurfaced, it being only necessary to ensure that the new surface extends substantially parallel to the initial surface. The difference between the reference measurements 7—9 and 7—10 is thus retained, which according to the foregoing results in the difference between the sides of approval and of rejection also remaining the same. Furthermore, the division of the vernier scale is thus not affected. It is evident that this difference also remains constant when the gauge is shifted, since the component part 8 of the gauge is shifted parallel to itself. Furthermore, resurfacing of the surface 7 after wear also does not cause difficulty.

The difference between the two reference measurements determined by the surfaces 7—9 and 7—10 is dependent on the dimensions and adjustment of the wedge 14, which in itself is simple to manufacture, since the correct relative positions of the component parts of the gauge may be ensured by removing a fairly considerable amount of material from the surface 6.

In the example shown, the gauge has the two reference measurements on one side. However, as an alternative, a gauge according to the invention may be so constructed that one reference measurement is provided on each side of a gauge body. For example, a gauge may be constructed in the known 8-form instead of in the form of a U.

What I claim is:

1. An adjustable gauge provided with two dimensional limits, comprising a first component part having one measuring surface integral therewith, said surface lying in a first plane, a second component part having two measuring surfaces integral therewith, said two surfaces lying in a second plane, said first and second planes being at an angle to each other, the distances between the measuring surface of said first component part and each of the two measuring surfaces of said second component part constituting said two limits, and means to displace one of said component parts in a direction parallel to the plane in which the integral surface thereon lies to alter the dimensional limits.

2. An adjustable gauge provided with two dimensional limits comprising a first component part having one uninterrupted measuring surface integral therewith, said surface lying in a first plane, a second component part having two spaced measuring surfaces integral therewith, said two surfaces lying in a second plane, said first and second planes being at an angle to each other, the distances between the measuring surface of said first component part and each of the two measuring surfaces of said second component part constituting said two limits, and means to displace one of said component parts in a direction parallel to the plane in which the integral surface thereon lies to alter the dimensional limits.

3. An adjustable gauge provided with two dimensional limits comprising a first component part having one measuring surface integral therewith, said surface lying in a first plane, a second component part having two measuring surfaces integral therewith, said two surfaces lying in a second plane, said first and second planes being at an angle to each other, the distances between the measuring surface of said first component part and each of the two measuring surfaces of said second component part constituting said two limits, a wedge-shaped body separating said first and second component parts, said wedge-shaped body having two converging faces, one being parallel to one of said planes and the other being parallel to the other of said planes, and means to displace one of said component parts in a direction parallel to the plane in which the integral surface thereon lies to alter the dimensional limits.

4. An adjustable gauge provided with two dimensional limits comprising a first component part having one measuring surface integral therewith, said surface lying in a first plane, a second component part having two measuring surfaces integral therewith, said two surfaces lying in a second plane, said first and second planes being at an angle to each other, the distances between the measuring surface of said first component part and each of the two measuring surfaces of said second component part constituting said two limits, a wedge-shaped body separating said first and second component parts, said wedge-shaped body having two converging faces, one being parallel to one of said planes of said measuring surfaces and the other being parallel to the other of said planes, the surfaces of said first and second component parts engaging said wedge-shaped body being coincident with said measuring surfaces, and means to displace one of said component parts in a direction parallel to the plane in which the integral surface thereon lies to alter the dimensional limits.

5. An adjustable gauge provided with two dimensional limits comprising a first component part having one measuring surface integral therewith, said surface lying in a first plane, a second component part having two measuring surfaces integral therewith, said two surfaces lying in a second plane, said first and second planes being at an angle to each other, the distances between the measuring surface of said first component part and each of the two measuring surfaces of said second component part constituting said two limits, a wedge-shaped body separating said first and second component parts, said wedge-shaped body having two converging faces, one being parallel to one of said planes of said measuring surfaces and the other being parallel to the other of said planes, the surfaces of said first and second component parts engaging said wedge-shaped body being coincident with said measuring surfaces, one of the surfaces of said component parts and the adjacent surface of said wedge-shaped body being graduated to constitute a vernier scale, and means to displace one of said component parts in a direction parallel to the plane in which the integral surface thereon lies to alter the dimensional limits.

6. An adjustable gauge provided with two dimensional limits comprising a first component part having one measuring surface integral therewith, said surface lying in a first plane, a second component part having two measuring surfaces integral therewith, said two surfaces lying in a second plane, said first and second planes being at an angle to each other, the distances between the measuring surface of said first component part and each of the two measuring surfaces of said second component part constituting said two limits, a wedge-shaped body separating said first and second component parts, said wedge-shaped body having two converging faces, one being parallel to one of said planes of said measuring surfaces and the other being parallel to the other of said planes, the surfaces of said first and second component parts engaging said wedge-shaped body being coincident with said measuring surfaces, spring-urged biasing means to hold one of said component parts against said wedge-shaped body, one of the surfaces of said component parts and the adjacent surfaces of said wedge-shaped body being graduated to constitute a vernier scale, and means to displace one of said component parts in a direction parallel to the plane in which the integral surface thereon lies to alter the dimensional limits.

ADRIANUS BRANDT.

References Cited in the file of this patent

UNITED STATES PATENTS

| Number | Name | Date |
| --- | --- | --- |
| 1,433,820 | Huesman | Oct. 31, 1922 |
| 1,489,576 | Hanson | Apr. 8, 1924 |
| 2,019,359 | Oswin | Oct. 29, 1935 |